United States Patent [19]

Tejima

[11] Patent Number: 4,918,476
[45] Date of Patent: Apr. 17, 1990

[54] STILL CAMERA

[75] Inventor: Yasuyuki Tejima, Tokyo, Japan

[73] Assignee: Asahi Kogaku Kogyo Kabushiki Kaisha, Tokyo, Japan

[21] Appl. No.: 194,920

[22] Filed: May 17, 1988

[30] Foreign Application Priority Data

May 19, 1987 [JP] Japan ................................ 62-120206

[51] Int. Cl.⁴ ...................... G03B 13/12; G03B 17/18
[52] U.S. Cl. .................................... 354/221; 354/219; 354/289.1
[58] Field of Search ...................... 354/220, 289.1, 219, 354/221, 222; 352/170, 171; 358/85

[56] References Cited

U.S. PATENT DOCUMENTS

| | | | |
|---|---|---|---|
| 3,116,365 | 12/1963 | Prescott | 358/85 |
| 4,239,356 | 12/1980 | Freudenschuss et al. | 352/170 |
| 4,560,261 | 12/1985 | Ueda et al. | 354/289.1 |

FOREIGN PATENT DOCUMENTS

| | | | |
|---|---|---|---|
| 347252 | 12/1978 | Austria | 352/170 |
| 2027324 | 12/1971 | Fed. Rep. of Germany | 354/220 |

Primary Examiner—A. A. Mathews
Attorney, Agent, or Firm—Sandler & Greenblum

[57] ABSTRACT

A still camera has a taking lens and a light emitting device for indicating actuation adapted to project an indication light to a projection area generally coincident with a taking area of a taking lens during actuation of a self-timer.

42 Claims, 3 Drawing Sheets

STILL CAMERA

BACKGROUND OF THE INVENTION

1. Field of the Invention

This invention relates to a still camera that is provided with a light emitting device for projecting an indication light toward an object when a self-timer is activated, and more particularly to a still camera, in which a person, acting as an object, can confirm the picture taking area of a taking lens because of the provision of this light emitting device for indicating actuation of the self-timer.

2. Prior Art

Many conventional cameras, which have been heretofore used, have a self-timer function for delaying the interval time from when a shutter button is depressed to when the shutter is released. Also, many still cameras are equipped with a light emitting device that includes a light source, such as a light emitting diode (hereinafter simply referred to "LED"), which is adapted to indicate the activation of the self-timer mode of operation.

In general, a light emitting device for indicating the actuation of the self-timer comprises a LED contained in a body, and a cover (e.g., transparent cover, diffusion plate, lens, or Fresnel lens) disposed in front of the LED.

The relationship between the taking area of a taking lens and the light projection area of a light emitting device for indicating actuation of the self-timer is variable. As shown in FIG. 5, for example, there is shown one in which the light projection area of a light emitting device 1 for indicating the actuation of the self-timer is large as compared with the taking area of a taking lens 2. In another example (not shown), the light projection area of the light emitting device is small as compared with the taking area of the lens. In still another example, the indicating light does not reach the other side because the light is blocked with a lens barrel.

When taking a picture in an ordinary manner, it is not difficult to include the object in the taking area because the photographer can actuate the shutter while visually confirming the object through the finder.

On the other hand, when a self-timer is used, the circumstance is different because the photographer is being included in the picture that is to be taken. In this case, the photographer conducts a framing through the finder, actuates the self-timer, pushes the shutter button and thereafter, quickly goes to the other persons in front of the camera. Therefore, when the persons move after the framing is completed, there is no way for the photographer to know whether the moved persons are still in the taking area of the taking lens at the moment when the shutter is released.

When many persons are to be taken as one group, the photographer often stands or sits in the extreme side of the group. In this case, it is very difficult for the photographer to know whether he is surely in the taking area of the taking lens.

SUMMARY OF THE INVENTION

The present invention has been developed to overcome the above-mentioned inconveniences. It is therefore an object of the present invention to provide a still camera, in which a person standing in front of the camera can confirm whether he is within the taking area of the taking lens.

The present invention has been accomplished by recognizing that a conventional light emitting device for indicating the actuation of a self-timer has heretofore been used only for indicating the self-timer actuation. In order to achieve the above-mentioned object, according to the present invention, the light projection area of the light emitting device for indicating the self-timer actuation is designed to be generally coincident with the taking area of a taking lens.

By virtue of the foregoing arrangement, a person can easily find out whether he is within the taking area of the taking lens by paying attention to whether the indication light can be seen by him.

BRIEF DESCRIPTION OF THE DRAWINGS

FIGS. 1 through 4 illustrate embodiments of a still camera according to the present invention, wherein;

FIG. 1 is a schematic view showing a concrete example of FIG. 4;

FIG. 2 is a front view of a still camera having a light emitting device for indicating a taking area of a taking lens;

FIG. 4 is a schematic view similar to FIG. 3(b), showing a second embodiment of the present invention;

DETAILED DESCRIPTION OF THE EMBODIMENTS

The present invention will be described hereunder with reference to the accompanying drawings.

Figure 1:
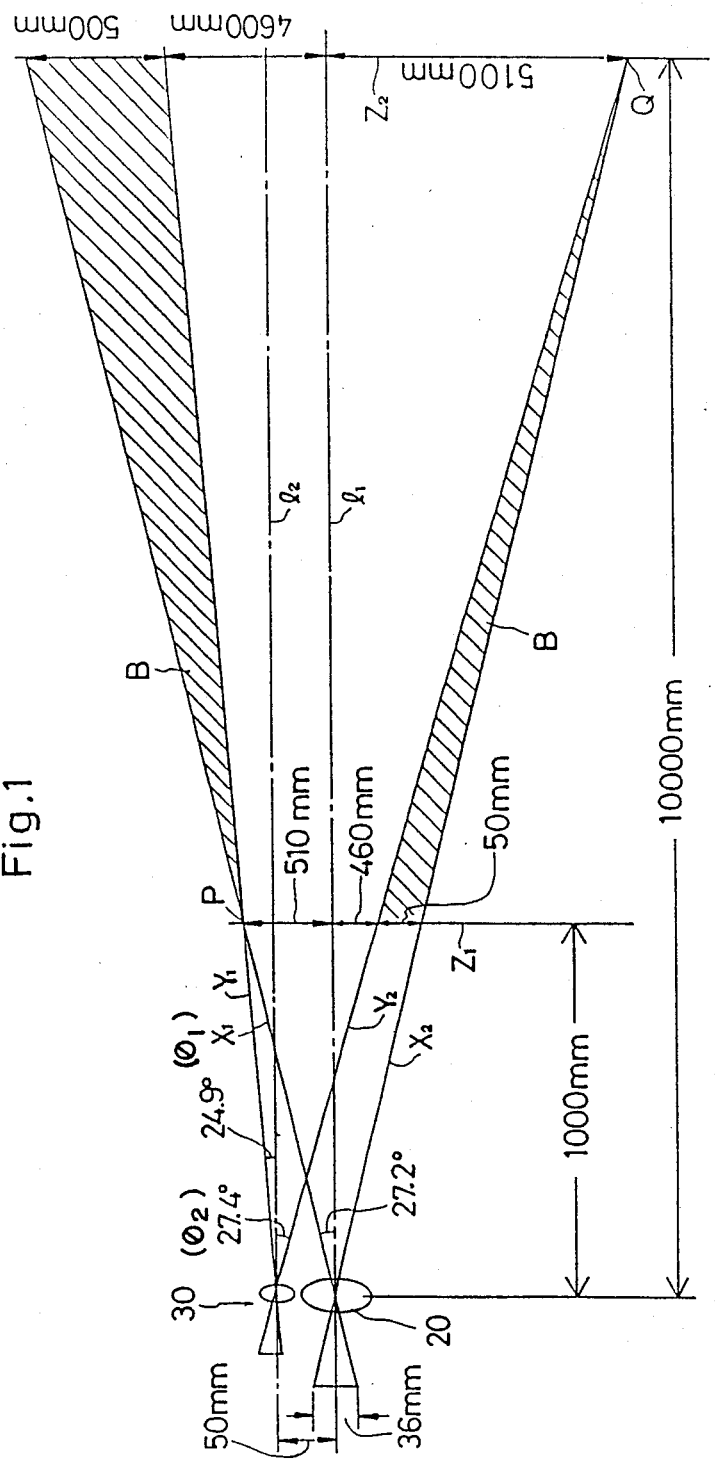
Figure 2:
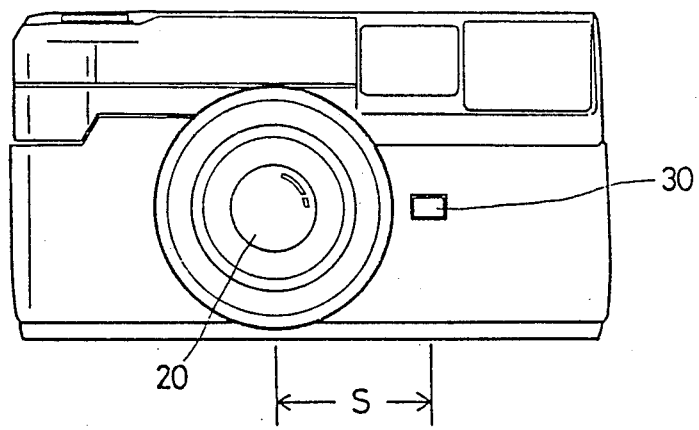
Figure 3A:
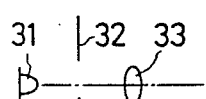
FIG. 3(a) is a schematic view showing the constitution of the light emitting device used in the camera of FIG. 2.
Figure 3B:
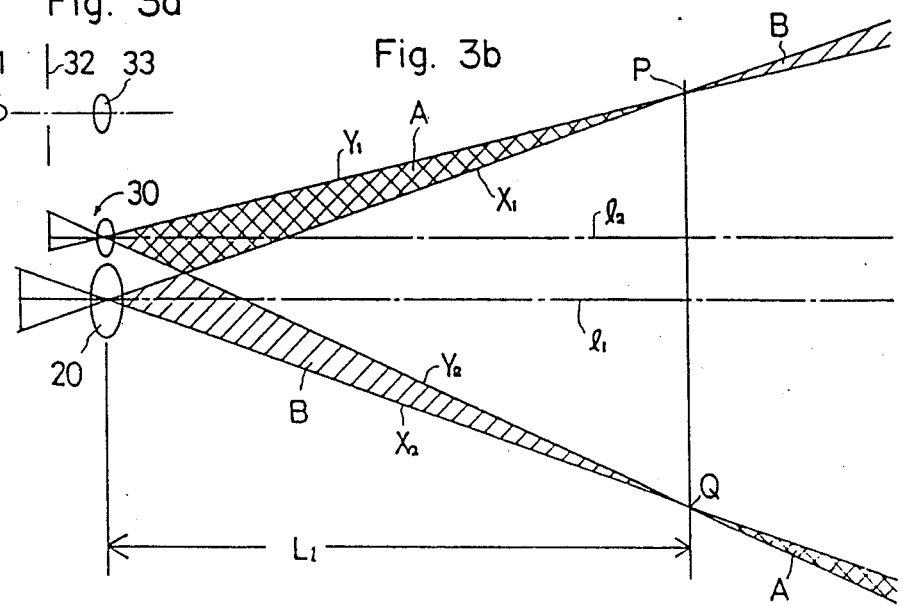
FIG. 3(b) is a schematic view showing the optical arrangement of the taking lens used on the camera of FIG. 2 and the light emitting device for indicating the actuation of the self-timer according to the first embodiment of the present invention.
Figure 4:
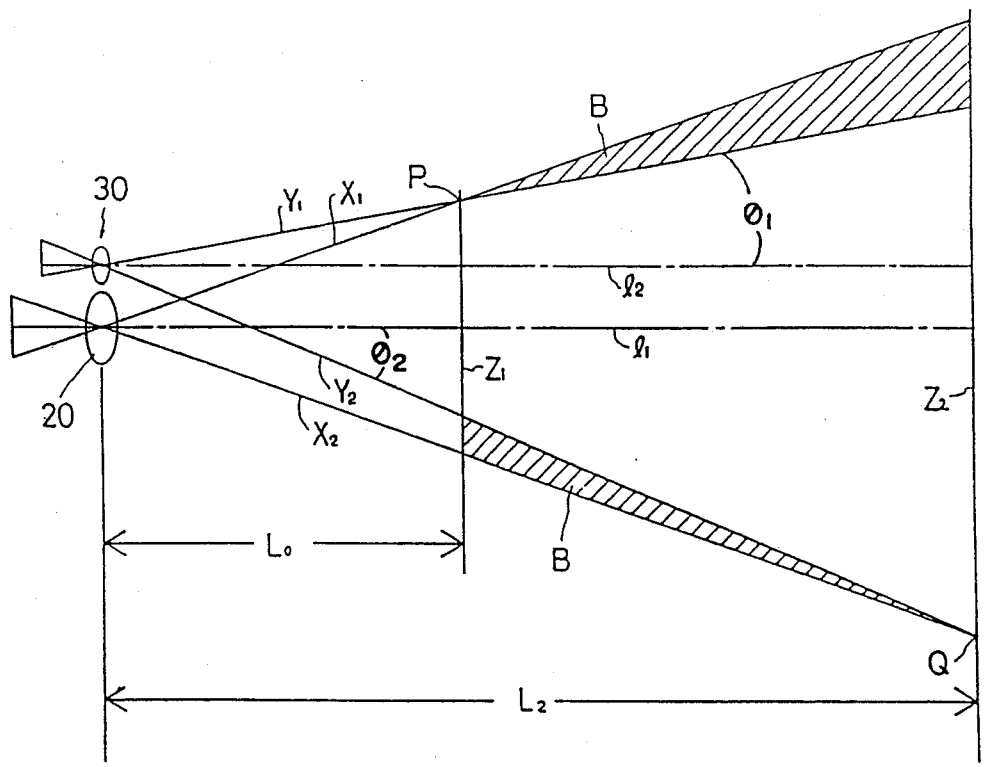
Figure 5:
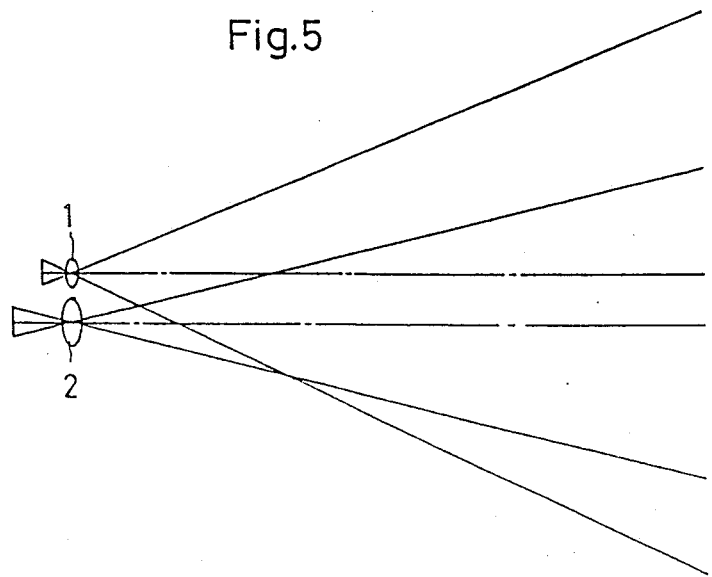
FIG. 5 is a schematic view showing the optical arrangement of a taking lens and a light emitting device for indicating actuation in a conventional still camera.

Referring to FIGS. 2 through 4, a general principle will be described, and then, an example, shown in FIG. 1, will be described.

A still camera 10 comprises a lens shutter camera, as shown in FIG. 2. The still camera 10 is provided with a taking lens 20 that is located proximate the center of its front body. A light emitting device 30, for indicating the actuation of a self-timer is adapted to project an indication light towards an object to be photographed when the self-timer is actuated. The light emitting device 30 is disposed in a position on the front of the camera body (see FIG. 2) that is spaced apart from the center of the taking lens 20 by a distance S.

The light emitting device 30 for indicating the actuation of the self-timer, as shown in FIG. 3(a), generally comprises a LED 31 that acts as a light source, a mask 32 for defining a sectional configuration of light emitted from the LED 31 to a rectangular shape similar to an aperture of the camera, a light projection lens 33 for projecting the light toward the object to be photographed.

However, the present invention is not limited to the above-mentioned embodiment of the light emitting device 30 for indicating actuation. For example, instead of providing the mask 32, a framework may be provided to the electrode of the light emitting surface of the LED 31. As long as the device is provided with a means for defining the area of light projection, many modifications can be made as in the prior art.

In the still camera 10, the light projection area of the light emitting device 30 is generally coincident with the taking area of the taking lens 20. However, since the taking lens 20 and the light emitting device 30 are located within a space S (wherein, generally S equals approximately 35 through 55 mm) therebetween, parallax is taken place between them. This makes it impossible to coincide the light projection area with the taking area along the entire distance range thereof.

In the preferred embodiment of a still camera of the present invention, there are several potential parallax problems to be considered. The schematic view of FIG. 1 shows one optical arrangement, viewed from above, wherein $X_1$, $X_2$ denote a borderline (this is actually a line but just for the convenience of explanation, it is referred to as a plane hereinafter) showing an angle of view spread of the taking lens 20, and $Y_1$ and $Y_2$ denote a borderline showing an angle of projection spread of the light emitting device 30.

FIG. 3(b) illustrates a first embodiment of the present invention. In the first embodiment, in order to make optical axis $l_1$ of the taking lens 20 parallel with optical axis $l_2$ of the projection lens 33 and in order to make the parallax zero at one predetermined taking distance $L_1$, the respective points of intersection P, Q, of $X_1$ and $Y_1$, and $X_2$ and $Y_2$ are located on the line intersecting the optical axis $l_1$ of the taking lens 20 at distance $L_1$ at right angles.

In this way, in order to make the points of intersection of the respective borderlines as P, Q, the angle $\theta_1$ formed between the borderline $Y_1$ for defining the end of the light emitting device 30 within the light projection area and the optical axis $l_2$ of the light emitting device 30, and the angle $\theta_2$ formed between the borderline $Y_2$ for defining the end of the light emitting device 30 projection area adjacent to the taking lens 20, and the optical axis $l_1$ of the taking lens 20 must be the following values. Since the axes $l_1$ and $l_2$ are in parallel relation with each other in this embodiment, the angles are shown in the figure with reference to the optical axis $l_2$ of the projection lens:

$$\theta_1 = \tan^{-1}\left(\frac{w}{2f} - \frac{s}{L_1}\right); \text{ and}$$

$$\theta_2 = \tan^{-1}\left(\frac{w}{2f} + \frac{s}{L_1}\right) \text{ where}$$

w = transverse length of the film surface;
f = focal length of the taking lens;
s = space; and
$L_1$ = predetermined taking distance.

If a person as the object is always on the line segment PQ in the above-mentioned arrangement, there is no problem. However, if the taking distance is changed, there is an untaken area A in which the taking lens 20 covers an angle less than the spread angle of the light emitting device 30 by the object taking person. Alternatively, there is a taking area B in which the taking lens 20 covers a spread angle greater than the spread angle of the light emitting device 30 and in which the indication light can not be seen by the object taking person.

In the case where the object is located within the taken area B in which the indication light is not seen, there is little problem, since the picture taking object will be included in the photograph. However, in the event the object is located within the untaken area A in which the indication light is seen, a person will be misled into believing that he will be included in the photograph. Thus, he does not move to another position, and the result is that he is not included in the picture. However, such an area as just mentioned can be reduced in actual practice so that it does not become a serious problem.

FIG. 4 is an illustration similar to FIG. 3(b), but showing a second embodiment of the present invention.

As previously described, in many cases the self-timer is used when a person, particularly the photographer, is to be included in the photograph, and the taking distance is naturally limited. Therefore, if the area, where the object is not taken, even if the indication light is seen, is eliminated by limiting the coverage to a predetermined distance, the above-mentioned problem can be substantially solved.

To this end, therefore, a near distance limit $L_0$ and a far distance limit $L_2$ are established as a distance range necessary for taking a picture. Light emitting device 30 is designed such that a line segment $Z_1$ intersecting optical axis $l_1$ at right angles is intersected with $X_1$, $Y_1$ at one point in the near distance limit $L_0$, and that the line segment $Z_2$ intersecting with optical axis $l_1$ at right angles is intersected with $X_2$ and $Y_2$ at one point in the far distance limit $L_2$. Specifically, the angle $\theta_1$ formed between the borderline $Y_1$ for defining the end of the light emitting device 30 within the light projection area and the optical axis $l_1$ of the taking lens 20, and the angle $\theta_2$ formed between the borderline $Y_2$ for defining the end of the light emitting device projection area adjacent the taking lens 20, and the optical axis $l_1$ of the taking lens 20 must be the following values. Since both axes $l_1$ and $l_2$ are in parallel relation with each other in this embodiment, the angles are shown in the figure with reference to the optical axis 2 of the projection lens:

$$\theta_1 = \tan^{-1}\left(\frac{w}{2f} - \frac{s}{L_0}\right); \text{ and}$$

$$\theta_2 = \tan^{-1}\left(\frac{w}{2f} + \frac{s}{L_2}\right) \text{ where}$$

w = transverse length of the film surface;
f = focal length of the taking lens;
s = space;
$L_0$ = near distance limit; and
$L_2$ = far distance limit.

With the above-mentioned arrangement, although the area B, which is taken even if the indication light is not seen, is produced within the range between the near distance limit $L_0$ and the far distance limit $L_2$, the area A (see FIG. 3), which is not taken even if the indication light is seen, is not produced. This means that a person acting as the object to be photographed can confirm that he is located within the taking area when he sees the indication light.

FIG. 1 shows one example obtained by substituting concrete figures for FIG. 4.

In this example, the taking distance range is 1 m to 10 m, which is usually sufficient as a picture taking distance when a self-timer is used.

If the transverse length of the film surface is established as 36 mm, and the focal length of the taking lens 20 as 35 mm, a half angle view is equal to 27.2°. Likewise, a distance corresponding to the half angle view is equal to approximately 510 mm at the 1,000 mm spot, and approximately 5100 mm at the 10,000 mm spot.

If the light emitting device 30 is established by correlating it to the taking areas with the space between the optical axis $l_1$ of the taking lens 20 and the optical axis $l_2$ of the light projection lens 33 being set at 50 mm, angle $\theta_1$, formed between the optical axis $l_2$ and $Y_1$ is equal to 24.9°, and the angle $\theta_2$, formed between $l_2$ and $Y_2$ is equal to 27.4°.

In this configuration, the area which is taken even if the indication light is not seen, is very small, being 50 mm on the line segment $Z_1$ and 500 mm on the line segment $Z_2$. This corresponds to only 5% of the taking area, which is practically negligible.

In this embodiment, the optical axis $l_1$ of the taking lens 20 and the optical axis $l_2$ of the light emitting device 30 are in parallel relation with each other. However, they may be intersected at the picture taking object side. In such a case, angles $\theta_1$ and $\theta_2$ may be established with reference to the optical axis $l_1$ instead of the optical axis $l_2$ of the light projection lens.

Although the light emitting device 30 for indicating the actuation of the self-timer is usually located on the body of a camera adjacent to the taking lens 20, as previously described, it is preferably located as near as possible to the taking lens 20 in order to minimize the parallax effect, as long as it is not blocked by the lens barrel. The light emitting device 30 may even be located at the foremost end of a lens barrel of the taking lens 20.

Further, in the above-mentioned embodiment, the description has been made on the premise that the view angle of the taking lens 20 does not change. However, where a zoom lens is used as the taking lens 20, the light emitting device 30 may be designed such that the LED 31 and the light projection lens 33 are movable so that the light projection angle of the light emitting device 30 is changed in association with the zooming of the zoom lens. With such an arrangement, the light projection area can be changed to follow the change of the taking area of the zoom lens so that a person acting as the object to be photographed can know whether he will be included in any photograph that is taken.

As described in the foregoing, according to a still camera of the present invention, the light projection area of the light emitting device 30 is generally coincident with the taking area of the taking lens 20. Therefore, a person acting as the object to be photographed can know whether he will be included in the photograph, depending on whether he can see the indication light coming from the light emitting device 30.

Therefore, the situation in which a person positioned near the edge of a taken picture coverage area is not photographed when a self-timer is used can be prevented.

What is claimed is:

1. A camera having means for indicating whether a person being photographed is within the picture taking area of a lens associated with said camera, comprising:
   means for delaying the actuation of a shutter of said camera;
   means for indicating that said actuation of said shutter has been delayed; and
   means for setting a viewing angle of said indicating means to substantially coincide with said picture taking area of said lens, wherein said person being photographed can see said indicating means by looking at said camera when said person is within said picture taking area of said lens.

2. The camera of claim 1, wherein said delaying means comprises a timer that delays the actuation of said shutter of said camera when a shutter release is operated.

3. The camera of claim 1, wherein said indicating means comprises a light emitting device.

4. The camera of claim 1, wherein said indicating means comprises a light emitting device that is activated when said shutter release is operated.

5. The camera of claim 1, wherein said indicating means comprises a light emitting diode.

6. The camera of claim 1, wherein said indicating means is located proximate said lens of said camera.

7. The camera of claim 1, wherein said setting means comprises a light projection lens for projecting the light from said indicating means towards said person to be photographed.

8. The camera of claim 1, further including a mask that converts light emitted from said indicating means to light having a rectangular shape.

9. The camera of claim 8, wherein said mask is disposed between said indicating means and said setting means.

10. The camera of claim 1, wherein said viewing angle of said indicating means changes in association with a zooming operation of said lens so that said viewing angle of said indicating means follows changes in the picture taking area of said lens as a result of said zooming operation.

11. The camera of claim 1, wherein said viewing angle of said indicating means is coincident with said picture taking area of said lens at a predetermined picture taking distance.

12. The camera of claim 1, wherein said person being photographed can see said indicating means by looking at said camera only when said person is within said picture taking area of said lens.

13. A still camera according to claim 1, wherein said lens and said indicating means are located with a space S therebetween, and angle $\theta_1$ formed between the optical axis of said lens and a borderline for defining one end of said indicating means within the picture taking area and an angle $\theta_2$ formed between the optical axis of said lens and a borderline for defining a second end of said indicating means within the picture taking area are established such that they satisfy the conditions:

$$\theta_1 = \tan^{-1}\left(\frac{w}{2f} - \frac{s}{L_1}\right); \text{ and}$$

$$\theta_2 = \tan^{-1}\left(\frac{w}{2f} + \frac{s}{L_1}\right) \text{ where}$$

w = transverse length of the film surface;
f = focal length of the taking lens;
s = space; and
$L_1$ = predetermined taking distance.

14. A camera having means for indicating whether a person being photographed is within the picture taking area of a lens associated with said camera, comprising:

a timer that delays the actuation of a shutter of said camera for a predetermined period of time after a shutter release is operated;

means for indicating that said timer is operating to delay the actuation of said shutter; and means for setting a viewing angle of said indicating means to substantially coincide with said picture taking area of said lens, wherein said person being photographed can see said indicating means by looking at said camera when said person is within said picture taking area of said lens.

15. The camera of claim 14, wherein said indicating means comprises a light emitting diode.

16. The camera of claim 14, wherein said setting means comprises a light projection lens for projecting the light from said indicating means towards said person to be photographed.

17. The camera of claim 14, wherein said viewing angle of said indicating means is coincident with said picture taking area of said lens at a predetermined picture taking distance.

18. The camera of claim 16, wherein said light projection lens is movable in accordance with a zooming operation of said lens of said camera so that said viewing angle of said indicating means follows changes in the picture taking area of said lens as a result of said zooming operation.

19. The camera of claim 18, wherein said light projection lens is located proximate said lens of said camera.

20. The camera of claim 16, wherein said viewing angle of said light emitted from said projection lens is coincident with said picture taking area of said lens at a predetermined picture taking distance.

21. The camera of claim 14, further including a mask that converts light emitted from said indicating means to light having a rectangular shape.

22. The camera of claim 17, further including a mask that converts light emitted from said indicating means to light having a rectangular shape.

23. The camera of claim 14, wherein said person being photographed can see said indicating means by looking at said camera only when said person is within said picture taking area of said lens.

24. A camera having means for indicating whether a person being photographed is within the picture taking area of a lens associated with said camera, comprising:

a timer that delays the actuation of a shutter of said camera for a predetermined period of time after a shutter release is operated;

means for emitting light to indicate that said timer is operated to delay the actuation of said shutter;

means for converting said emitted light to a rectangular aperture for defining a light projection area; and means for adjusting a viewing angle of said light projecting area to substantially coincide with said picture taking area of said lens, wherein said person being photographed can see said emitted light when said person looks at said camera and when said person is within said picture taking area of said lens.

25. The camera of claim 24, wherein said adjusting means is movable in accordance with a zooming operation of said lens of said camera so that said viewing angle of said emitted light follows changes in the picture taking area of said lens as a result of said zooming operation.

26. The camera of claim 25, wherein said viewing angle of said emitted light is coincident with said picture taking area of said lens at a predetermined picture taking distance.

27. The camera of claim 25, wherein said adjusting means is located proximate said lens of said camera.

28. The camera of claim 24, wherein said emitting light means and said adjusting means is movable in accordance with a zooming operation of said lens of said camera so that said viewing angle of said indicating means follows changes in the picture taking area of said lens as a result of said zooming operation.

29. The camera of claim 28, wherein said adjusting means is located proximate said lens of said camera.

30. The camera of claim 28, wherein said viewing angle of said emitted light is coincident with said picture taking area of said lens at a predetermined picture taking distance.

31. The camera of claim 24, wherein said light projecting area is included within said picture taking area between a near distance limitation and a far distance limitation of a picture taking distance range of said lens of said camera.

32. A still camera according to claim 31, wherein said lens and said light emitting means are located with a space S therebetween, and angle $\theta_1$ formed between the optical axis of said lens and a borderline for defining one end of said light emitting means within said light projection area and an angle $\theta_2$ formed between the optical axis of said lens and a borderline for defining a second end of said light emitting means within said light projection area are established such that they satisfy the conditions:

$$\theta_1 = \tan^{-1}\left(\frac{w}{2f} - \frac{s}{L_0}\right); \text{ and}$$

$$\theta_2 = \tan^{-1}\left(\frac{w}{2f} + \frac{s}{L_2}\right) \text{where}$$

w = transverse length of the film surface;
f = focal length of the taking lens;
s = space;
$L_0$ = near distance limit; and
$L_2$ = far distance limit.

33. The camera of claim 24, wherein said person being photographed can see said indicating means by looking at said camera only when said person is within said picture taking area of said lens.

34. A camera having means for indicating whether a person being photographed is within the picture taking area of a lens associated with said camera, comprising:

a timer that delays the actuation of a shutter of said camera for a predetermined period of time after a shutter release is operated;

a light emitting diode that is illuminated when said timer is delaying the actuation of said shutter;

a mask that transforms light from said light emitting diode into a shape similar to an aperture of said lens of said camera; and a light projection lens that focuses said light that has been transformed by said mask, said focused light having a viewing angle that substantially coincides with the picture taking area of said lens of said camera, wherein said person being photographed can see the illumination of said light emitting diode when said person looks at said camera if said person is within said picture taking area of said lens.

35. The camera of claim 34, wherein said viewing angle of said emitted light is coincident with said picture taking area of said lens at a predetermined picture taking distance.

36. The camera of claim 34, wherein said light projection lens is movable in accordance with a zooming operation of said lens of said camera so that said viewing angle of said emitted light follows changes in the picture taking area of said lens as a result of said zooming operation.

37. The camera of claim 36, wherein said viewing angle of said focused light is included within said picture taking area between a near distance limitation and a far distance limitation of a picture taking distance range of said lens of said camera.

38. The camera of claim 34, wherein said light emitting diode and said light projecting lens is movable in accordance with a zooming operation of said lens of said camera so that said viewing angle of said emitted light follows changes in the picture taking area of said lens as a result of said zooming operation.

39. The camera of claim 38, wherein said viewing angle of said focused light is included within said picture taking area between a near distance limitation and a far distance limitation of a picture taking distance range of said lens of said camera.

40. The camera of claim 34, wherein said light projection lens is movable in accordance with a zooming operation of said lens of said camera so that said viewing angle of said emitted light follows changes in the picture taking area of said lens as a result of said zooming operation.

41. The camera of claim 40, wherein said viewing angle of said focused light is included within said picture taking area between a near distance limitation and a far distance limitation of a picture taking distance range of said lens of said camera.

42. The camera of claim 34, wherein said person being photographed can see said indicating means by looking at said camera only when said person is within said picture taking area of said lens.

* * * * *